United States Patent
Zhu et al.

(10) Patent No.: US 10,896,320 B2
(45) Date of Patent: Jan. 19, 2021

(54) CHILD FACE DISTANCE ALERT SYSTEM

(71) Applicant: Baidu USA LLC, Sunnyvale, CA (US)

(72) Inventors: Shengdong Zhu, Sunnyvale, CA (US);
Lei Zhong, Sunnyvale, CA (US);
Kaisheng Song, Sunnyvale, CA (US);
Jia Guo, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 16/191,136

(22) Filed: Nov. 14, 2018

(65) Prior Publication Data
US 2020/0151432 A1    May 14, 2020

(51) Int. Cl.
*G06K 9/00* (2006.01)
*G06K 9/62* (2006.01)
(Continued)

(52) U.S. Cl.
CPC ......... *G06K 9/00288* (2013.01); *G06K 9/628* (2013.01); *G06K 9/6228* (2013.01); *G06K 9/6257* (2013.01); *G06N 3/08* (2013.01); *G06T 7/50* (2017.01); *G08B 21/02* (2013.01); *G06K 2009/00322* (2013.01);
(Continued)

(58) Field of Classification Search
CPC .............. H04N 5/232; H04N 5/23219; G02B 27/0093; G06F 16/784; G06F 3/013; G06F 1/1626; G06F 1/1686; G06F 1/3231; G06N 20/00; G06T 2207/30201; G06T 13/40; G06T 2200/24; G06T 2207/10016; G06T 2207/20081; G06T 7/11; G06T 7/136; G06T 7/194; G06T 7/246; G06T 7/248; G06T 7/73; A61B 2560/0431; A61B 3/0025; G06K 9/00281; G06K 9/00288; G06K 9/00597; G06K 9/00604
See application file for complete search history.

(56) References Cited

U.S. PATENT DOCUMENTS 10,470,654 B2 *  11/2019  Schmid ................ A61B 3/0041
2010/0007665 A1 *  1/2010  Smith ..................... G06T 13/40
345/473

(Continued)

OTHER PUBLICATIONS https://wikidiff.com/equal/proportional, proportional.pdf discussing the difference between proportional and equal. (Year: 2020).*

*Primary Examiner* — Alison Slater
(74) *Attorney, Agent, or Firm* — Womble Bond Dickinson (US) LLP (57) ABSTRACT

In an embodiment, a children face alert system is provided for use with a smart device with a display screen. A neural network model trained with dataset images with embedded distance information can run in the background of the smart device. When receiving a captured image frame of the face of a child using the smart device, the neural network model can determine that the captured image frame is from a child, and further determine whether the face of the child is within a predetermined distance to the display screen based on a size of the face on the captured image frame. If the face is within the predetermined distance, the smart device can display an alert that the face of the child is too close to the display screen and pause one or more user applications until the child's face moves outside of the predetermined distance.

20 Claims, 5 Drawing Sheets

Image A
301

Image B
302

(51) Int. Cl.
  *H04N 5/232*  (2006.01)
  *A61B 3/00*  (2006.01)
  *A61B 3/032*  (2006.01)
  *G06N 3/08*  (2006.01)
  *G06T 7/50*  (2017.01)
  *G08B 21/02*  (2006.01)

(52) U.S. Cl.
  CPC ............ *G06T 2207/20081* (2013.01); *G06T 2207/20084* (2013.01); *H04N 5/232* (2013.01)

(56) References Cited

U.S. PATENT DOCUMENTS

| | | | |
|---|---|---|---|
| 2010/0328442 A1* | 12/2010 | Yang | G06K 9/00234 348/77 |
| 2014/0354531 A1* | 12/2014 | Foreman | G06F 3/0481 345/156 |
| 2015/0379716 A1* | 12/2015 | Peng | G06T 7/73 382/106 |
| 2016/0139662 A1* | 5/2016 | Dabhade | G06K 9/00255 345/156 |
| 2016/0275339 A1* | 9/2016 | De la Torre | G06K 9/00281 |
| 2016/0373645 A1* | 12/2016 | Lin | H04N 5/23219 |
| 2018/0125352 A1* | 5/2018 | Schmid | A61B 3/0041 |
| 2018/0144649 A1* | 5/2018 | el Kaliouby | G06K 9/00302 |
| 2019/0019012 A1* | 1/2019 | Huang | G06F 16/784 |
| 2019/0102608 A1* | 4/2019 | Wang | H04N 5/23219 |
| 2019/0252054 A1* | 8/2019 | Dirani | G16H 50/30 |

* cited by examiner

CHILD FACE DISTANCE ALERT SYSTEM

TECHNICAL FIELD

Embodiments of the present disclosure relate generally to smart devices. More particularly, embodiments of the disclosure relate to a system and method for monitoring distances of children faces to smart devices, such as smart speakers.

BACKGROUND

Smart devices, e.g., smart speakers, can offer interactive actions and hands-free activation with the help of one "hot word". A smart device can have a display screen to provide services via voice control commands, for example, online search, video calls, media playbacks, video streaming, and cloud photos.

Due to the entertaining nature of the services, users interacting with a screen-enabled smart device can be easily engrossed in what is happening on the display screen. When users, children in particular, spend too much time at a close distance to a small screen, they run the risk of straining their eyes and causing lasting damage to their vision.

Some existing solutions can alert a user when the user's face is too close to a display screen of a smart device using a depth sensor or a resource-intensive algorithm. However, these existing solutions either require extra hardware components or are not suitable in a resource-restricted device. Therefore, there is a need for a resource-efficient solution for generating alerts when the face of a user is too close to a screen-enabled smart device.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In an embodiment, a children face alert system is provided for use with a smart device with a display screen. A neural network model trained with dataset images with embedded distance information can run in the background of the smart device. When receiving a captured image frame of the face of a child using the smart device, the neural network model can determine that the captured image frame is from a child, and further determine whether the face of the child is within a predetermined distance to the display screen based on a size of the face on the captured image frame. If the face is within the predetermined distance, the smart device can display an alert that the face of the child is too close to the display screen and pause one or more user applications until the child's face moves outside of the predetermined distance.

The smart device can be a smart speaker, a mobile device and any other home appliance with a display screen and with a microprocessor and memory to run a software application.

The smart device can display a message that the face of the user is too close to the display screen, and can simultaneously pause any services the user is using, until the face of the user moves outside of the predetermined distance. In an embodiment, the smart device can wait until after the face of the user stays within the predetermined distance for a configurable period of time (e.g., 10 seconds) before taking actions to alert the user.

The smart device captures images of the face of a child at a configurable capture rate, for example, 4 frames per second, and can preprocess each image frame to reduce it to a pixel size equal to that of a training dataset image (e.g., 24×24 pixels).

In an embodiment, the neural network model can be a convolutional neural network model with a number of layers. The number of layers can be determined based on a combination of the fixed pixel size and an expected accuracy of image classification.

For example, given the fixed pixel size of each training dataset image, multiple convolutional neural network models can be trained initially, each with a different composition of layers. Each trained model can be tested on a smart device with given hardware capabilities. If all trained models can achieve the expected accuracy rate of image classification within an expected response time, the trained model with the smallest number of layers can be selected, for use with the children face alert system.

In an embodiment, the training dataset images include images of faces taken at various distances to a camera. The size of a face will differ based on the distance. The distance information, represented by the size of a face, can be encoded in the convolutional network model. The model can in turn be used to determine how far a face is from the camera based on a size of the face on a captured image frame.

The convolutional neural network model can continuously run in the background of a resource-restricted smart device. The reduced image size and fine-tuned composition of layers in the neural network model can reduce CPU and memory usage of the model without sacrificing its image classification accuracy.

Embodiments of the invention describe a convolutional neural network model to detect distances of children faces to a display screen of a smart device for illustration purposes only. One of ordinary skill in the art will appreciate that other types of neural networks can be similarly trained, and that other embodiments can be used.

For example, the type of layers, the number of layers, and the number of neurons in each layer of the convolutional neural network model can be adjusted based on different requirements for resource usage and/or image classification accuracy. Different training datasets can be used to train the model, so that the model can be used to monitor children faces at different distances to a display screen of a smart device. The system can also be configured to generate alerts and take appropriate actions when a face of an individual of any age is within a predetermined distance of a display screen.

Figure 1:
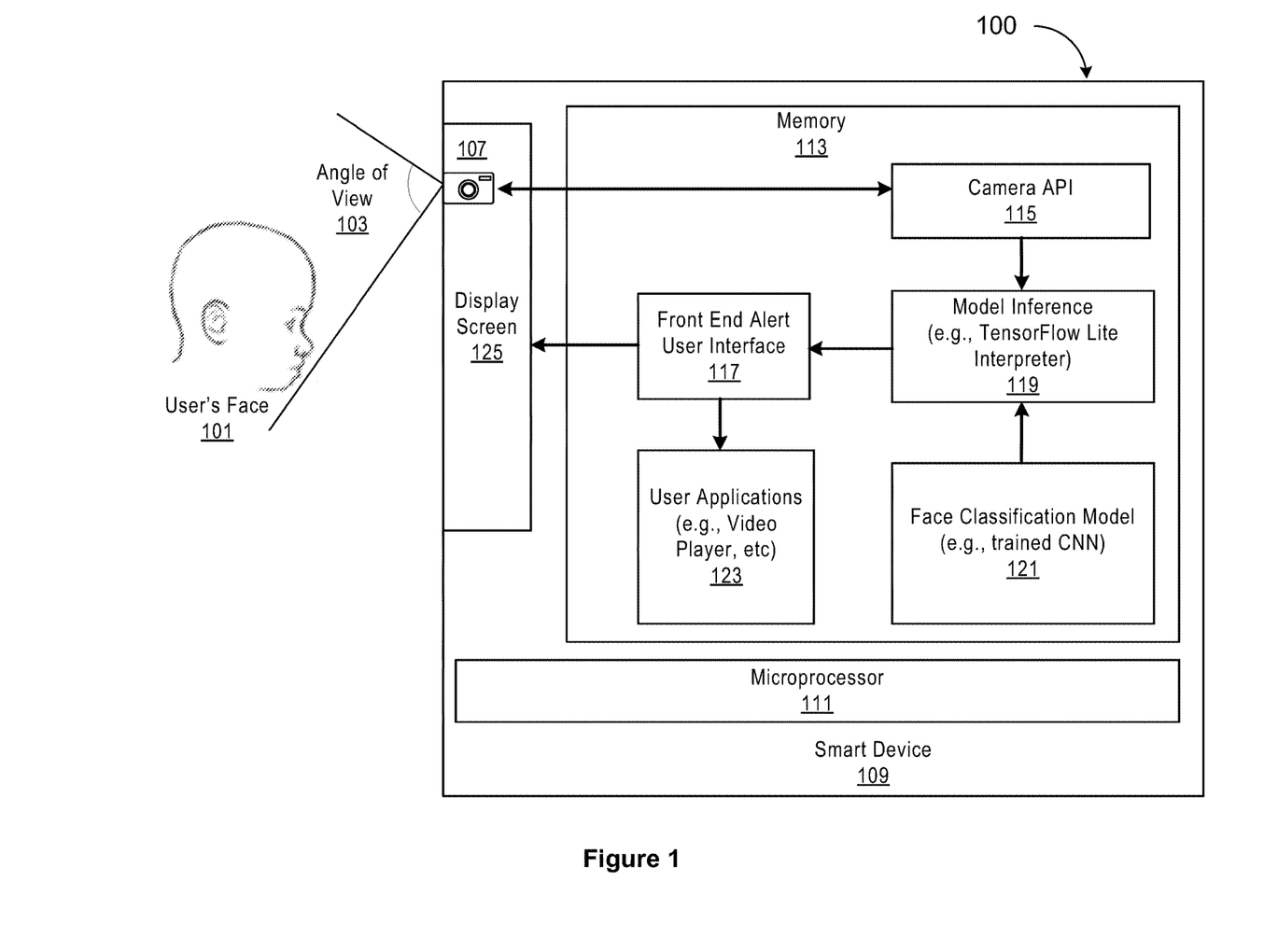
FIG. 1 illustrates a system for monitoring distances of children faces to smart devices, in accordance with an embodiment.

FIG. 1 illustrates a system for monitoring distances of children faces to smart devices, in accordance with an embodiment.

As shown in FIG. 1, the system 100 includes a number of software components, including a camera API 115, a model inference library 119, a face classification model 121, and a front end alert user interface 117. Each of the above software components can be loaded into memory 113, and run on a microprocessor 111 in a smart device 109.

The camera API 115 can be used to integrate a camera 107 into the children face distance alert system 100. The camera API 115 can capture image frames of a user's face 101 that is in an angle of view 103 of the camera 107. Using the camera API, the camera 107 can be configured to limit its frame capture rate (e.g., 4 frames per second), and to change the size of each captured frame. For example, each captured image frame can be changed to 24×24 pixels. The model inference component 119 can execute the face classification model 121 using a set of operators. In an embodiment, the model inference 119 can also use a neural network API for hardware acceleration. The face classification model 121 can represent a convolutional neural network model that has been trained and optimized for an operating system (e.g., Android OS) running on the smart device 109.

In an embodiment, the face classification model 121 can receive captured image frames by the camera API 115, and can classify each of the captured image frames into one of a number of categories. If at least one captured image frame is determined to be a face of a child, and that the face is within a predetermined distance of the display screen 125, the front end alert user interface 117 can pause one or more user applications 123, and display an alert message that the face of the user is too close to the display screen 125.

For example, if a child is watching video or browsing contents on the display screen 125, and the system determines that the child is sitting within a predetermined distance to the display screen 125, the system can display an alert message, and pause or stop the video until the child sits back.

In an embodiment, the system can be configured to display alert messages and/or pause running user applications only when a child's face is determined to be within a predetermined distance to a display screen for a predetermined period of time. For example, if a child simply moves his face within a predetermined distance to the display screen 125 and quickly moves away, the system would not display an alert message or pause any running user application even if a single image frame of the child's face has been captured and correctly classified.

In an embodiment, the camera 107 can be part of, or adjacent to, the display screen 125. Therefore, a distance of the user's face 101 to the display screen 125 can be determined to be within a range based a distance of the user's face 101 to the camera 107, the size of the display screen 125, and the tilting angle of the display screen 125. The distance 105 of the user's face 101 to the camera 107 can be based on a size of the user's face 101 as viewed from the camera 107. The relationships between distances and image sizes can be encoded in the face classification model 121.

Figure 2:
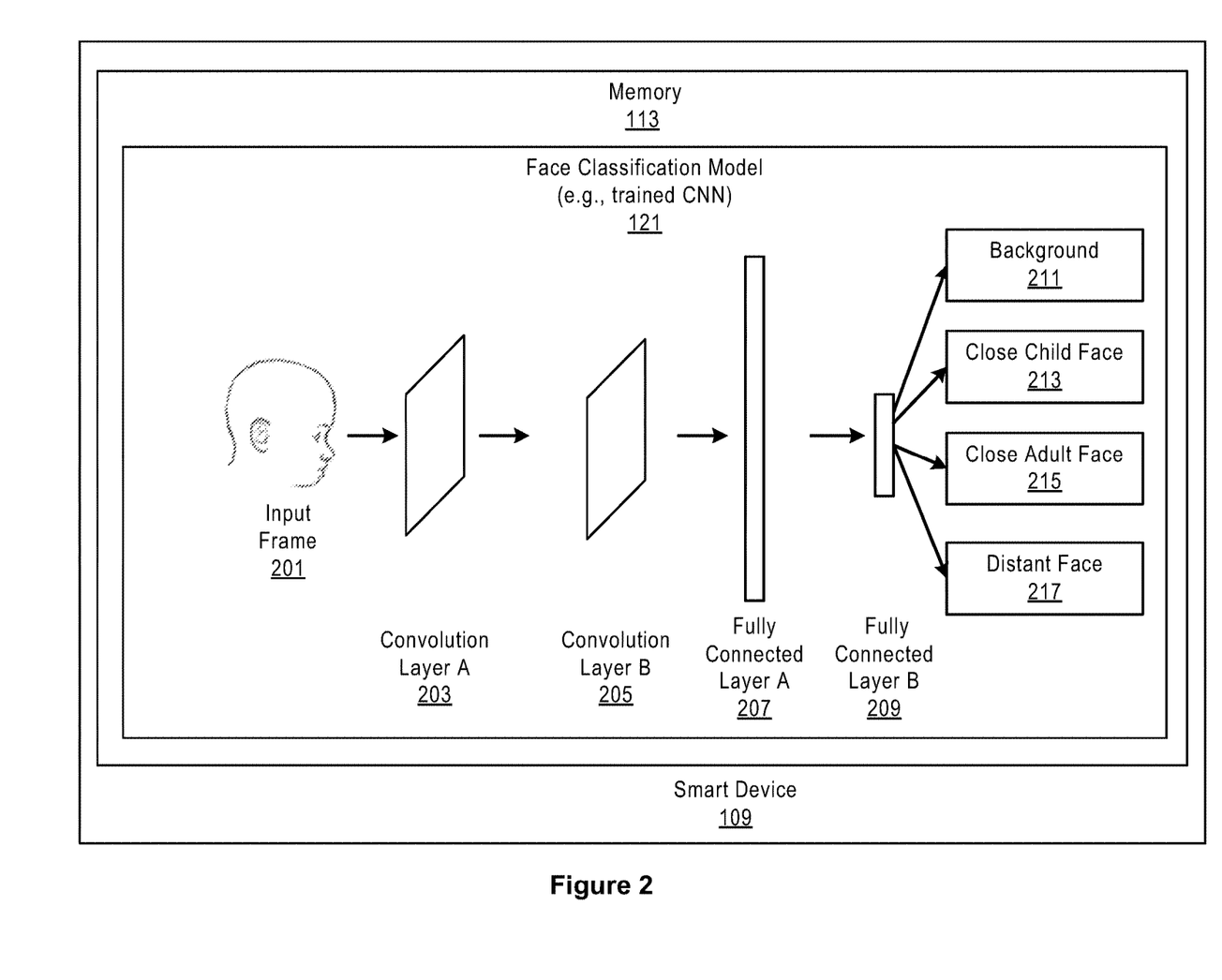
FIG. 2 illustrates an example trained face classification model in accordance with an embodiment.

FIG. 2 illustrates an example trained face classification model in accordance with an embodiment.

The face classification model 121 can be a trained model of a neural network. A neural network can include a collection of connected neurons designed to model a human brain. Each neuron in the neural network can be connected to other neurons, such that the output of one neuron can be received as the input of another neuron. Each neuron can have an activation function that combines the values of all inputs to that neuron to generate an output. Connections among neurons can be parameterized to enhance or inhibit signals transmitted between the neurons.

A neural network can be programmatically trained to perform a task using a set of training data (training dataset) with known solutions, or ground truths. To train a neural network, the neural network can repeatedly compare its output for input data, with the known solutions for the input data. Based on the comparisons, neural network can incrementally adjust its parameters, so that the neural network's output approaches the known solutions. The neural network can then be tested against a set of testing data that is different from the training dataset without changing the parameters of the neural network. The resulting neural network can be compiled into a binary artifact and deployed as a component in an application to perform a particular analytical task. The binary artifact is the trained neural network model.

A convolutional neural network is a type of neural network that includes an input layer, an output layer, and multiple hidden layers. The hidden layers can include convolutional layers, pooling layers, fully connected layers and normalization layers.

In an embodiment, the face classification model 121 can be a convolutional neural network model, which includes convolutional layer A 203, convolutional layer B 205, fully connected layer A 207 and fully connected layer B 209. Each convolutional layer 203 or 205 can be used to extract features from the input image frame 201, and each fully connected layer can be used to learn the extracted features and classify data representing the features into various categories.

In an embodiment, each convolutional layer is a 2-dimensional (2D) layer. In the convolutional layer A 203, the input image frame 201 is represented by a 2-dimensional array of pixel values. A number of filters can be applied to the 2D array of pixel values to generate an equal number of feature maps. The number of the feature maps is equal to the number of filters. Each filter can be 2D array of numbers to represent a piece of the input image frame 201. In the convolutional layer B 205, the same filters can be applied to the feature maps to generate a new set of feature maps.

The fully connected layer 207 can apply one or more filters with the size of the input image frame 201 (e.g., 24×24 pixels) to the new set of feature maps to generate an output. The fully connected layer 209 can further apply the one or more filters to the output to generate a predicted result for the input image frame 201. The predicted result can be one of "Background" 211, "Close Child Face" 213, "Close Adult Face" 215, and "Distant Face" 217. When being classified as "Background" 213, the input image frame 201 has been determined to be part of a background scene. When being classified as "Close Child Face", the input image frame 201 has been determined to be a child face that is within a predetermined distance to a display screen of a smart device. Similarly, "Close Adult Face" 215 means that the input image frame 201 is an adult face within the predetermined distance to the display screen, and "distant face" 217 means that the face is outside of the predetermined distance to the display screen.

In an embodiment, to further increase the performance of the face classification model 121 in a resource-restricted device, a fixed-point quantization technique can be used. A quantization technique represents inputs, outputs and intermediate outputs of the model in a fixed number of values (e.g., 256 values) that are evenly distributed between a predefined minimum and a predefined maximum. Those values can in turn be represented by a reduced number of bits (e.g., 8 bits), thus reducing resource consumption. Further, as described above, the input image frame 201 can be reduced in size, for example, from 640×480 pixels to 24×24 pixels. A pixelated frame caused by such a size reduction can be smoothed by various downsampling methods. One way to implement a downsampling method is through a depth-wise convolution technique.

Figure 3:
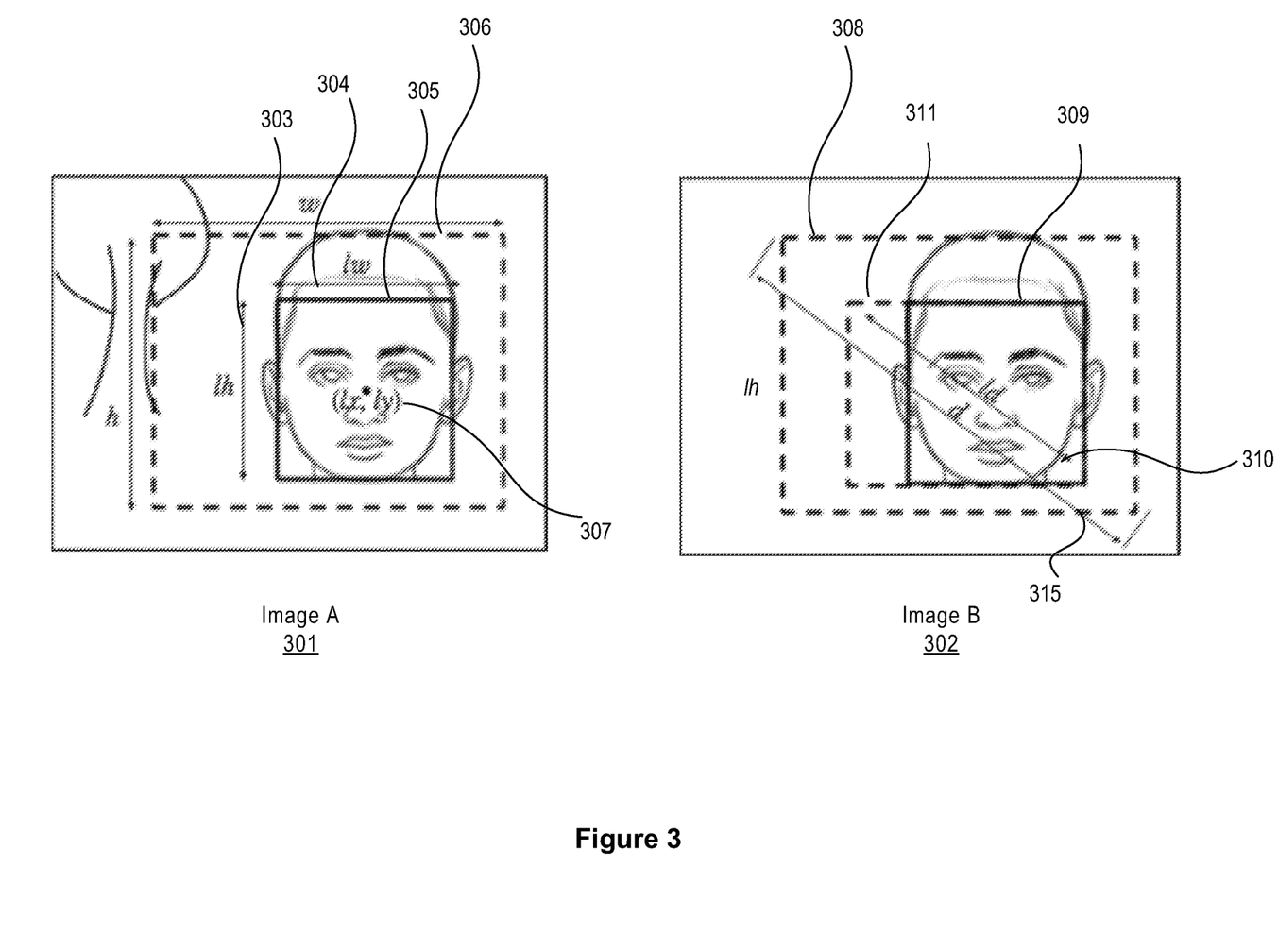
FIG. 3 illustrates an example images used to train the face classification model, in accordance with an embodiment.

FIG. 3 illustrates example images used to train the face classification model, in accordance with an embodiment.

Training dataset images include facial images of children in a number of age groups, facial images of adults in different scenes and facing various directions. Each training dataset image, for example, image A 301 and image B 302, can be cropped to a fixed-sized rectangle 306 or 308 with a fixed ratio (e.g., 4:3) between the length and the width. In an embodiment, the fixed ratio can be the same ratio between the length and the width of the captured frame.

In an embodiment, a bounding box 305 or 309 can be placed on the face in each facial image 301 or 302, to indicate the size of the face. The size of the bounding box can be measured by a head breadth lw 304 and a mentocrinion length lh 303. Each bounding box has a center; for example, the center of the bounding box 305 in image A 301 is (lx, ly). Since the training dataset images may include different face shapes and different facial directions, bounding boxes for the training dataset images may be different in shapes and sizes. The face may not always be at the center of a rectangle. As such, the center of the bounding box and the center of the enclosing rectangle may be different. In an embodiment, the center of a rectangle can be located in an area that is defined by (lx−w/4,lx+w/4) and (y−h/4,ly+h/4), where w and h are respectively the width and height of the rectangle.

Based on the width and length of the rectangle, a diagonal of the rectangle can be calculated. In the example of image B 302, assuming that the rectangle 308 has a length of 4 and a width of 3, a diagonal d 305 of the rectangle 308 would be 5. A diagonal ld 310 of an equivalent rectangle 311 extended from the enclosed bounding box 309 can be calculated by the formula ld=max(5/4 lw, 5/3 lh)). To a camera with given specifications, the ratios between d and ld can be obtained for images of a human face taken at various distances to the camera.

Table 1 below shows distances and corresponding ratios in accordance with an embodiment.

TABLE 1

| Distance (cm) | Ratios (d/ld) |
|---|---|
| 10 | 0.70 |
| 20 | 1.40 |
| 30 | 2.10 |

As shown in Table 1, the ratios between d/ld are proportional to the distances of a face to a camera. The relationships between the ratios and distances can be used to determine how far a face is from a display screen of a smart device.

Figure 4:
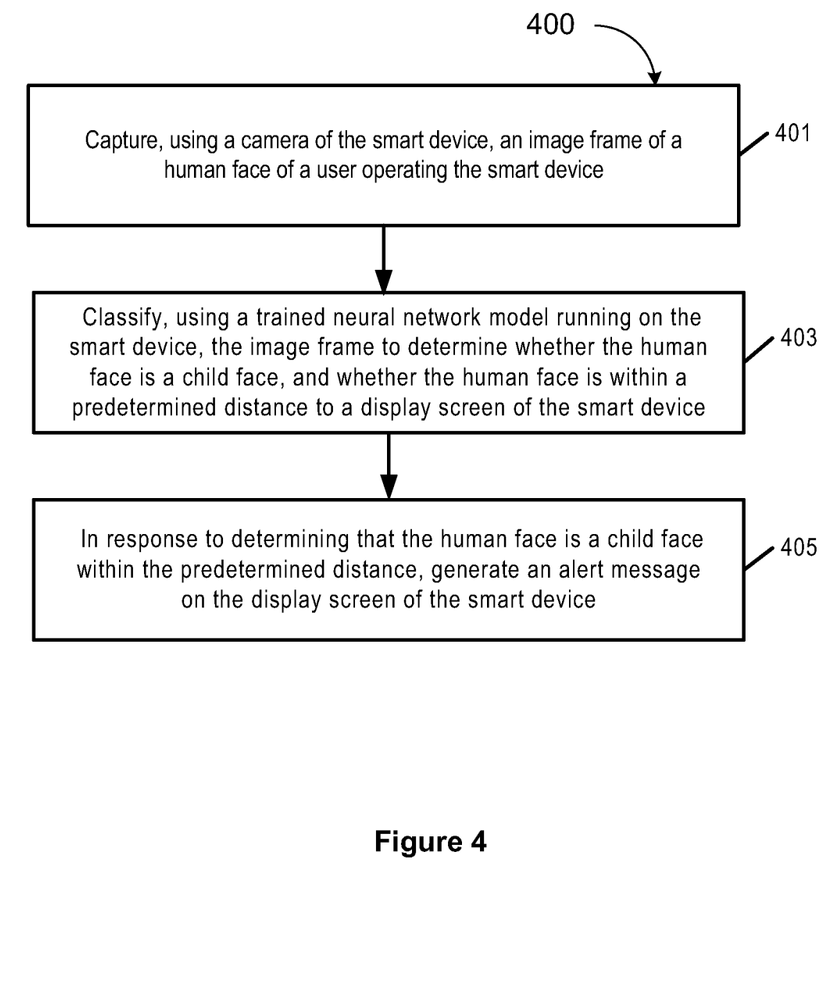
FIG. 4 is a flow diagram illustrating an example of process 400 for monitoring distances between a human face and a display screen of a smart device, in accordance with an embodiment.

FIG. 4 is a flow diagram illustrating an example of process 400 for monitoring distances between a human face and a display screen of a smart device, in accordance with an embodiment.

Process 400 may be performed by processing logic which may include software, hardware, or a combination thereof. Process 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 800 may be performed by one or more of software components 115, 117, 119 and 121 illustrated in FIG. 1.

Referring to FIG. 4, in operation 401, processing logic in a smart device (e.g., smart speaker with a display screen) receives an image frame of a human face, wherein the image frame is captured by a camera on the smart device. A camera API can be invoked to limit a frame capture rate of the camera to a predetermined value to reduce resource usage of the smart device. Processing logic can preprocess the image frame to reduce its pixel size to a pair of predetermined values. For example, the image frame can be reduced to 24×24 pixels, which is the size of each cropped training dataset image. In operation 403, processing logic invokes a trained neural network model running on the smart device to classify the image frame to determine whether the human face is a child face, and whether the human face is within a predetermined distance to a display screen of the smart device. In operation 405, processing logic generates an alert message the display screen of the smart device in response to determining that the human face is a child face within the predetermined distance. The smart device also pauses one or more user applications in response to determining that the child face is within the predetermined distance to the display screen.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
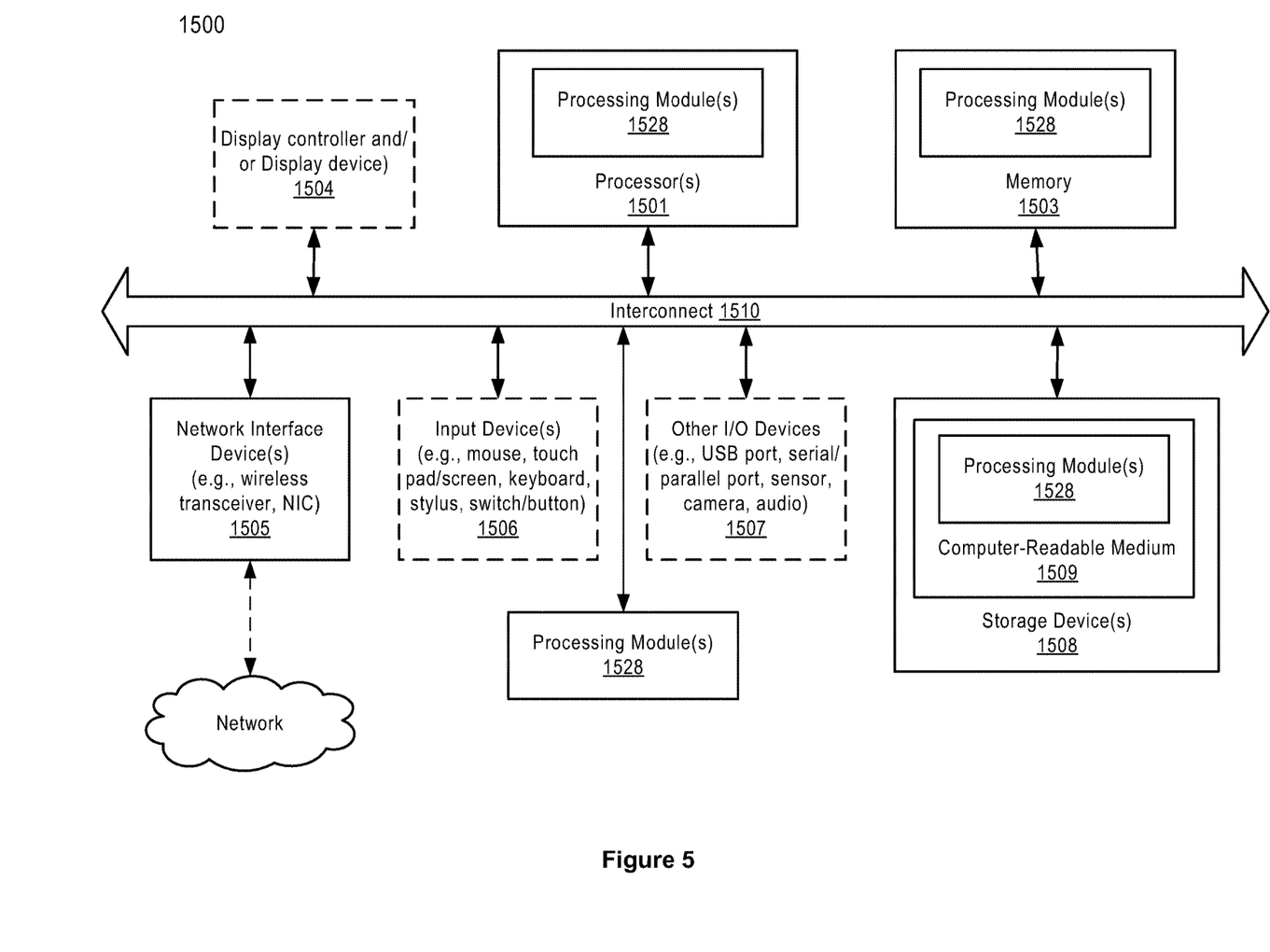
FIG. 5 is a block diagram illustrating an example of a distance alert system which may be used with one embodiment of the disclosure.

FIG. 5 is a block diagram illustrating an example of a distance alert system which may be used with one embodiment of the disclosure.

For example, system 1500 may represent any of distance monitoring systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, routing module 307, and real-time map generation module 309. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for monitoring distances between a human face and a display screen of a smart device, the method comprising:
   capturing, using a camera of the smart device, an image frame of a human face of a user operating the smart device;
   classifying, using a trained neural network model running on the smart device, the human face on the image frame to determine whether the human face is a child face, the trained neural network model determining a first rectangle having a fixed size;
   in response to determining that the human face is a child face, creating a second rectangle by extending a bounding box around the human face, the second rectangle proportional to the first rectangle;

determining, using the trained neural network model, a distance of the human face to the display screen based on a ratio between a diagonal of the first rectangle and a diagonal of the second rectangle;

comparing the distance of the determined child face to the display screen with a predetermined distance to determine whether the determined child face is within the predetermined distance to the display screen of the smart device; and in response to determining that the determined child face is within the predetermined distance, generating an alert message on the display screen of the smart device.

2. The method of claim 1, wherein the trained neural network model is to classify the human face on the captured image frame into one of a plurality of categories, including a close child face, a close adult face, a background, and a distant face.

3. The method of claim 1, wherein the smart device reduces a pixel size of the image frame to a pair of predetermined values.

4. The method of claim 3, wherein the smart device is a smart speaker or a mobile device, wherein the trained neural network model is a convolutional neural network with a number of layers, wherein the number of layers is determined based at least on the pixel size and an expected accuracy of image classification.

5. The method of claim 1, wherein in response to determining that the human face is within the predetermined distance, the smart device additionally pauses one or more running user applications on the smart device.

6. The method of claim 1, wherein the neural network model is trained with training dataset images, wherein each of the training dataset images includes information indicating a distance of a human face from a camera that is used to take that training dataset image.

7. The method of claim 6, wherein each of the training dataset images includes a bounding box enclosing a face on the training dataset image, and is cropped to a fixed-sized rectangle, wherein a ratio between a diagonal of the fixed-sized rectangle and a diagonal of a proportional rectangle extended from the bounding box is calculated, wherein the ratio is proportional to the distance associated with the training dataset image.

8. The method of claim 1, wherein the camera is configured using a camera application programming interface (API) to limit a frame capture rate of the camera to a predetermined number.

9. A non-transitory machine-readable medium having instructions stored therein for monitoring distances between a human face and a display screen of a smart device, the instructions, when executed by a processor, causing the processor to perform operations, the operations comprising:

capturing, using a camera of the smart device, an image frame of a human face of a user operating the smart device;

classifying, using a trained neural network model running on the smart device, the human face on the image frame to determine whether the human face is a child face, the trained neural network model determining a first rectangle having a fixed size;

in response to determining that the human face is a child face, creating a second rectangle by extending a bounding box around the human face, the second rectangle proportional to the first rectangle;

determining, using the trained neural network model, a distance of the human face to the display screen based on a ratio between a diagonal of the first rectangle and a diagonal of the second rectangle;

comparing the distance of the determined child face to the display screen with a predetermined distance to determine whether the determined child face is within the predetermined distance to the display screen of the smart device; and in response to determining that the determined child face is within the predetermined distance, generating an alert message on the display screen of the smart device.

10. The non-transitory machine-readable medium of claim 9, wherein the trained neural network model is to classify the human face on the captured image frame into one of a plurality of categories, including a close child face, a close adult face, a background, and a distant face.

11. The non-transitory machine-readable medium of claim 9, wherein the smart device reduces a pixel size of the image frame to a pair of predetermined values.

12. The non-transitory machine-readable medium of claim 11, wherein the smart device is a smart speaker or a mobile device, wherein the trained neural network model is a convolutional neural network with a number of layers, wherein the number of layers is determined based at least on the pixel size and an expected accuracy of image classification.

13. The non-transitory machine-readable medium of claim 9, wherein in response to determining that the human face is within the predetermined distance, the smart device additionally pauses one or more running user applications on the smart device.

14. The non-transitory machine-readable medium of claim 9, wherein the neural network model is trained with training dataset images, wherein each of the training dataset images includes information indicating a distance of a human face from a camera that is used to take that training dataset image.

15. The non-transitory machine-readable medium of claim 14, wherein each of the training dataset images includes a bounding box enclosing a face on the training dataset image, and is cropped to a fixed-sized rectangle, wherein a ratio between a diagonal of the cropped rectangle and a diagonal of a proportional rectangle extended from the bounding box is calculated, wherein the ratio is proportional to the distance associated with the training dataset image.

16. The non-transitory machine-readable medium of claim 9, wherein the camera is configured using a camera application programming interface (API) to limit a frame capture rate of the camera to a predetermined number.

17. A data processing system, comprising:

a processor; and a memory coupled to the processor to store instructions for monitoring distances between a human face and a display screen of a smart device, the instructions, when executed by a processor, causing the processor to perform operations, the operations comprising:

capturing, using a camera of the smart device, an image frame of a human face of a user operating the smart device;

classifying, using a trained neural network model running on the smart device, the human face on the image frame to determine whether the human face is a child face, the trained neural network model determining a first rectangle having a fixed size;

in response to determining that the human face is a child face, creating a second rectangle by extending a bounding box around the human face, the second rectangle proportional to the first rectangle;

determining, using the trained neural network model, a distance of the human face to the display screen based on a ratio between a diagonal of the first rectangle and a diagonal of the second rectangle;

comparing the distance of the determined child face to the display screen with a predetermined distance to determine whether the determined child face is within the predetermined distance to the display screen of the smart device; and in response to determining that the determined child face is within the predetermined distance, generating an alert message on the display screen of the smart device.

18. The system of claim 17, wherein the trained neural network model is to classify the human face on the captured image frame into one of a plurality of categories, including a close child face, a close adult face, a background, and a distant face.

19. The system of claim 17, wherein the smart device reduces a pixel size of the image frame to a pair of predetermined values.

20. The system of 19, wherein the smart device is a smart speaker or a mobile device, wherein the trained neural network model is a convolutional neural network with a number of layers, wherein the number of layers is determined based at least on the pixel size and an expected accuracy of image classification.

* * * * *